United States Patent
Haim et al.

(10) Patent No.: US 12,306,719 B1
(45) Date of Patent: May 20, 2025

(54) LINK DOWN RESILIENCE

(71) Applicant: Amazon Technologies, Inc., Seattle, WA (US)

(72) Inventors: Roi Ben Haim, Netanya (IL); Guy Nakibly, Kedumim (IL); Sergey Kleyman, Ramat Gan (IL); Ariel Pescovsky, Kfar Saba (IL); Muhamad Grefat, Zarzir (IL); Uri Leder, Lotem (IL)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 18/193,279

(22) Filed: Mar. 30, 2023

(51) Int. Cl.
G06F 11/00 (2006.01)
G06F 11/14 (2006.01)
G06F 13/42 (2006.01)

(52) U.S. Cl.
CPC ...... *G06F 11/1443* (2013.01); *G06F 13/4221* (2013.01); *G06F 2201/86* (2013.01); *G06F 2213/0026* (2013.01)

(58) Field of Classification Search
CPC ............. G06F 11/1443; G06F 13/4221; G06F 2202/86; H04L 1/18–1864
See application file for complete search history.

(56) References Cited

U.S. PATENT DOCUMENTS

| | | | |
|---|---|---|---|
| 2007/0245210 A1* | 10/2007 | Markley | H04L 43/50 714/758 |
| 2009/0103543 A1* | 4/2009 | Marczewski | H04L 1/1874 370/394 |
| 2014/0189427 A1* | 7/2014 | Jayaprakash Bharadwaj | G06F 11/1415 714/15 |
| 2020/0186414 A1* | 6/2020 | Das Sharma | G06F 13/4278 |
| 2022/0382706 A1* | 12/2022 | Jeon | G06F 13/4221 |
| 2023/0261795 A1* | 8/2023 | He | H04L 1/1874 370/464 |

* cited by examiner

*Primary Examiner* — Marc Duncan
(74) *Attorney, Agent, or Firm* — Weaver Austin Villeneuve & Sampson LLP

(57) ABSTRACT

A link layer reliability (LLR) circuit of a communication device can receive an indication that a link down event has occurred on a bus link with a peer device. The LLR circuit can prevent the link down event from triggering a reset of configuration registers containing bus settings for the bus link. Once the bus link has been restored, the LLR circuit can send a retry request to the peer device indicating an expected sequence number associated with a transaction that the LLR circuit is expecting from the peer device. The LLR circuit may receive a retry acknowledgment from the peer device indicating receipt of the retry request for the transaction corresponding to the expected sequence number, and payload data for the transaction corresponding to the expected sequence number.

19 Claims, 7 Drawing Sheets

LINK DOWN RESILIENCE

BACKGROUND

Data transfer between two integrated circuit devices that are coupled via a physical bus link can be performed based on a bus protocol. Some bus protocols, such as, Peripheral Component Interconnect express (PCIe), and Compute Express Link (CXL), can provide a mechanism in their link layer for reliable data delivery. For example, error-detecting codes, such as link cyclic redundancy check (LCRC), can be added to each transaction layer packet to ensure data integrity across the PCIe link. However, in some cases, the bus link may go down and become unreliable, which can cause loss of data that may not be desirable.

BRIEF DESCRIPTION OF THE DRAWINGS

Various embodiments in accordance with the present disclosure will be described with reference to the drawings, in which.

DETAILED DESCRIPTION

Figure 1:
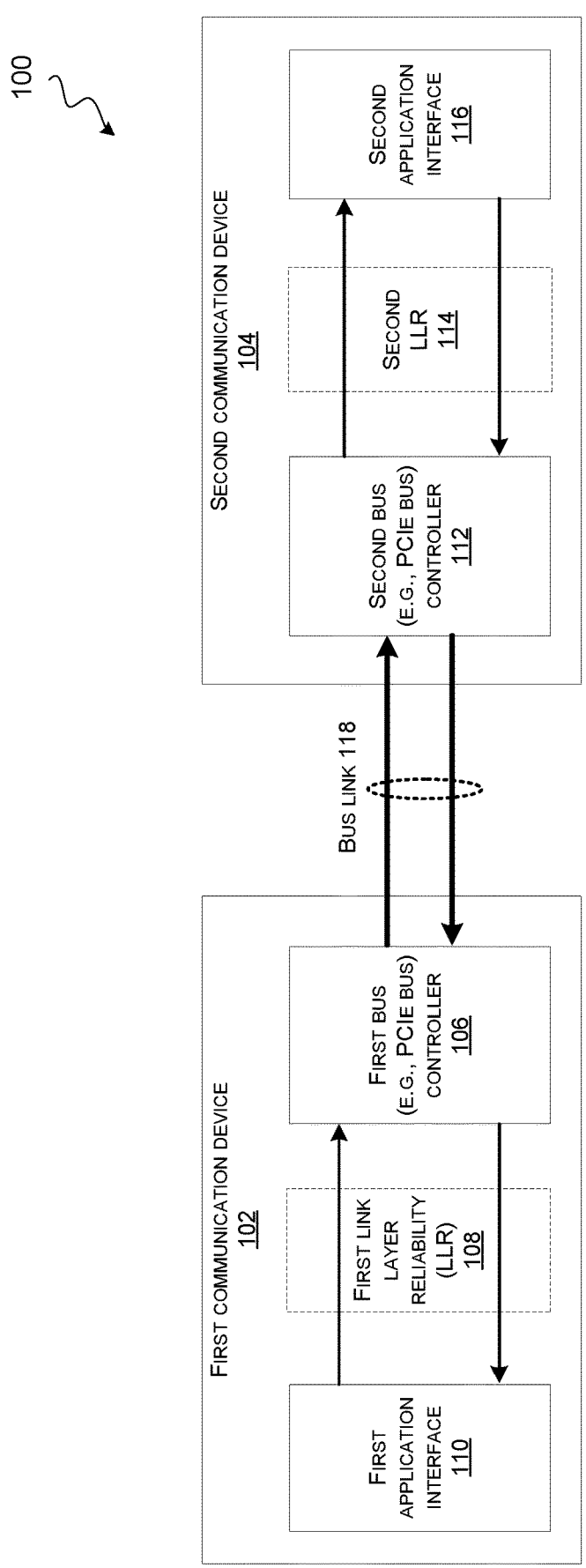
FIG. 1 illustrates a computing system that can provide link down resilience for a bus link between two communication devices, according to some embodiments.

Most bus protocols support reliable data delivery for transactions between two communication devices in a computing system over a physical link. The communication devices may include system-on-chips (SoCs), field programmable gate arrays (FPGAs), system-on-modules (SoMs), or other suitable integrated circuits. As an example, Peripheral Component Interconnect express (PCIe) and Compute Express Link (CXL) bus protocols provide a hardware-based mechanism in their link layer for data integrity and reliability. However, the physical link can be prone to failure, e.g., due to failure of a link component, noise from electrical or thermal sources, or other causes. Generally, when the link goes down, the link layer can become unreliable and in-transit packets may be lost. For example, the link down event may be considered as a fatal event for PCIe, and the PCIe configuration space registers and internal buffers may get reset, and the state machines may return to their default states. Some of the transactions taking place between the communication devices during the link down event may not complete. Furthermore, once the link has been restored and is operational again, there may be no mechanism to track the incomplete transactions and whether the data for the incomplete transactions needs to be re-transmitted.

In some cases, data for the incomplete transactions may not be recovered, and processes executing on the two communication devices may have to be restarted. Therefore, link down events can be problematic, especially in customer facing applications that may demand uninterrupted service. For example, the computing system can be part of the underlying hardware for server computers used for high-performance data centers, or cloud computing services. Frequent link down events may result in poor system performance due to frequent interruptions in the customer-facing applications running on these server computers.

Techniques are described herein to maintain link reliability between two communication devices during a link down event using a link reliability layer that is built on top of the existing bus protocol stack. In some embodiments, link reliability can be provided using a link layer reliability (LLR) circuit on each side of the bus link to support full-duplex communication between the two communication devices. At each side of the bus link, the LLR circuit can interface with the application layer and the transaction layer of the respective bus controller. In some embodiments, credit-based flow control (FC) can be used for communicating transactions between the two communication devices. The LLR circuit can provide link down resilience by preventing the reset of the configuration registers of the bus link upon detecting a link down event, and by executing a retry sequence after the link has been restored to retry transactions that did not complete due to the link down event.

The LLR circuit may include a retry buffer to store payload data for each transaction that it receives from the application interface to be transmitted to the peer device over the bus link. A LLR header can be added to each packet that is transmitted to the peer device over the bus link that includes information indicating whether the packet includes payload data or control bits. The LLR circuit can track the transactions that are being sent on the bus link using a TX-side sequence number counter. The LLR circuit on the peer device can also track the transactions received on the bus link using a RX-side sequence number counter. The LLR circuit on the peer device can send an acknowledgement (ack) upon receiving one or more transactions from the remote TX-side. Each ack received by the LLR circuit from the peer device can be configured to acknowledge multiple transactions sent by the LLR circuit according to a programmable ratio. The LLR circuit can remove the payload data for the packets from the retry buffer after receiving the ack for the corresponding transactions from the peer device.

When a link down event occurs due to the failure of the bus link, the LLR circuit on each side may receive an indication that a link down event has occurred. The LLR circuit may prevent the link down event from triggering a reset to the configuration space registers for the bus link to make the link down event transparent to the higher-level software so that configuration space registers maintain their programming after the link recovery. The LLR circuit may also halt the traffic on the transmission path upon receiving the link down indication to manage the transmission flow control, monitor the status of the relevant components in the communication device until they are ready for link recovery, and then indicate to the bus controller that the bus link can be restored. Upon detecting that the bus link has been restored, the LLR circuit may execute the retry flow before resuming the normal operation.

The retry flow can be executed to synchronize the current sequence number between the communication devices, and resend the packets that were lost due to the link down event. In some implementations, the LLR circuit on a communication device (e.g., a retry initiator) may initiate the retry flow to request data from the peer device (e.g., a retry target) corresponding to the lost transactions. For example, the retry initiator may send a control packet on the bus link to the peer device that includes a retry request and an expected sequence number associated with a transaction that the peer device was expecting when the bus link went down. In response, the retry target may send another control packet on the bus link to the retry initiator comprising a retry ack and the expected sequence number. The retry target may then send a protocol packet on the bus link to the retry initiator comprising the payload data for the transaction associated with the expected sequence number. Upon receiving the payload data for the transaction corresponding to the expected sequence number, the retry initiator can resume the normal operation by un-halting the traffic being sent to the bus link from the application interface on the transmission path.

In various examples, each communication device can be an initiator device that sends transactions to a target device (e.g., peer device) over the bus link, and/or a target device that receives transactions from an initiator device (e.g., peer device) over the bus link. Thus, the LLR circuit can support full-duplex communication between the two communication devices. The LLR circuit can be part of the bus controller, or a component coupled to the bus controller in the communication device. Thus, various embodiments can provide link down resilience using LLR circuits on both side of the bus link to minimize data loss, and without the involvement of the higher-level software. The techniques described herein can be used to provide link down resilience for bus protocols that do not support link reliability for the link down events.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a computing system 100 that can provide link down resilience for a bus link between two communication devices, according to some embodiments.

The computing system 100 may include a first communication device 102 and a second communication device 104 that are connected to a bus link 118 via a first bus controller 106 and a second bus controller 112, respectively. In some implementations, each of the first communication device 102 and the second communication device 104 may include IC devices that can be part of different SoCs. As an example, the IC devices may include network devices, input/output (I/O) controllers, or accelerators, among other examples.

The bus link 118 may provide a physical link between the communication devices 102 and 104 based on any suitable bus protocol, e.g., PCIe, or CXL. In some implementations, the bus link 118 may include multiple communication links, with each communication link comprising two or more lanes. For example, in some embodiments, the bus link 118 may support Serializer/De-serializer (SERDES) physical layer (PHY) interface to provide high speed communication links among multiple devices. Each of the first bus controller 106 and the second bus controller 112 may include PCIe/CXL cores to support the relevant bus protocol stack based on the implementation.

In some examples, the first bus controller 106 and the second bus controller 112 are PCIe controllers that implement the PCIe protocol stack comprising respective transaction layers, data link layers, and physical layers. In various implementations, a PHY interface (e.g., SERDES PHY) can be part of each of the first bus controller 106 and the second bus controller 112, or an independent unit coupled to each end of the bus link 118. Each of the first bus controller 106 and the second bus controller 112 may include configuration registers (e.g., PCIe configuration space registers) that can be programmed to configure the bus link 118. Each of the first bus controller 106 and the second bus controller 112 may manage link interfaces to the bus link 118 (e.g., PCIe ports). For example, when the bus link 118 goes down, or is back up again after the link recovery, the first bus controller 106 and the second bus controller 112 may receive appropriate indications from a corresponding PCIe port. Note that the recovery of the bus link 118 from a link down event can be performed using any suitable method without deviating from the scope of the disclosure.

A first application interface 110 and the second application interface 116 may provide a respective interface to other components or subsystems (e.g., processors, accelerators, memory, I/O, peripherals, etc.) of the computing system 100 via different interconnect fabrics. The different interconnect fabrics may include Credited eXtensible Stream (CXS), Coherent Hub Interconnect (CHI), Advanced eXtensible Interface (AXI), Advanced High-performance bus (AHB), Advanced Peripheral Bus (APB), etc., based on the applications supported by the computing system 100.

Some embodiments can support credit-based flow control for performing the transactions between the first communication device 102 and the second communication device 104. For example, the transmitting device can be allocated a certain number of credits for sending packets across the bus link 118, and the receiving device can request data from the transmitter using those credits. The credit-based flow control can be used to prevent overflow of buffers, and to comply with the ordering rules. Different flow control credits can be issued for different types of transactions (e.g., posted, non-posted, completion, etc.), and for data and header packets.

Some embodiments can provide resiliency during link down events using a reliability layer that is built on top of the bus protocol stack implemented by the first bus controller 106 and the second bus controller 112, which may otherwise not support link reliability. As shown in FIG. 1, a first LLR 108 can be placed between the first application interface 110 and the first bus controller 106, and a second LLR 114 can be placed between the second application interface 116 and the second bus controller 112 to provide resilience to the bus link 118. Each of the first LLR 108 and the second LLR 114 may support transmitter (TX) and receiver (RX) data paths for transmitting and receiving packets for transactions associated with various applications. For example, each of the first LLR 108 and the second LLR 114 may include circuitry to store and manage payload data in a retry buffer for each transaction that is received for transmission to the other side of the bus link 118 so that the transactions that do not complete due to link failure can be retried and completed after the link recovery.

As an example, the first LLR 108 may receive payload data for a transaction via the first application interface 110 to be transmitted to the second communication device 104. The first LLR 108 may hold the payload data in a retry buffer until an acknowledgement (ack) is received from the second communication device 104 upon receipt of the transmitted data. The first LLR 108 may insert an LLR header in each packet with the payload data and send the packet to the second LLR 114 via the first bus controller 106 and the second bus controller 112 over the bus link 118. The header type bit in the LLR header may indicate that the packet is a protocol packet that includes payload data. The first LLR 108 may maintain a TX-side sequence number counter that increments a TX write pointer to the retry buffer for each protocol packet having the payload data that is sent out over the bus link 118 to the second communication device 104. For example, the TX write pointer may represent an entry index where the next payload data can be stored.

The second LLR 114 may also maintain a RX-side sequence number counter that increments a sequence number for each transaction it receives over the bus link 118 with the payload data. The second LLR 114 can send a control packet over the bus link 118 to the first LLR 108 to acknowledge the receipt of the payload data. For example, the second LLR 114 may insert an LLR header with a header type bit indicating that the packet is a control packet with an ack. In some embodiments, the second LLR 114 may send an ack to the first LLR 108 for every N number of transactions received by the second LLR 114. N can be based on a programmable ratio ack2credit. For example, for every 8 transactions (e.g., N is 8) received by second LLR 114, one ack can be returned to the first LLR 108 and available credits can be incremented by 8. Upon receiving the control packet with the ack, the first LLR 108 may remove N entries associated with that ack from the retry buffer. Thus, each of the first LLR 108 and the second LLR 114 may maintain a separate snapshot of the sequence number that is expected to be synchronized under normal operation. For example, both the TX-side sequence number counter and the RX-side sequence number counter may be initialized to the same value (e.g., 0) at reset.

When the bus link 118 goes down, each of the first LLR 108 and the second LLR 114 may receive an indication from the first bus controller 106 and the second bus controller, respectively, that a link down event has occurred on the bus link 118. The first LLR 108 and the second IR layer 114 may stop transmitting and wait for the bus link 118 to be restored. In this case, the payload data for the transactions that did not receive a corresponding ack can be held in the retry buffer on the first LLR 108. Each of the first LLR 108 and the second LLR 114 may be configured to prevent the link down event from triggering a reset of the configuration registers containing the bus settings for the bus link 118, and monitor the status of the data path and various sub-components. For example, the first LLR 108 and the second LLR 114 may track the completion of all the pending transactions (e.g., posted transactions) in the TX and the RX path, track the traffic flow via the corresponding application interface, as well as track the internal states of the corresponding bus controllers. Once the data path is idle, and the traffic flow via the corresponding application interface is flushed, the first LLR 108 and the second LLR 114 can instruct the first bus controller 106 and the second bus controller 112, respectively, to restore the bus link 118.

Upon receiving an indication that the bus link 118 has been restored, the first LLR 108 and the second LLR 114 may execute a retry flow to maintain the link down resilience. The retry flow is executed to synchronize the current sequence number on the both the communication devices, and resend the packets that may have been lost while the bus link 118 was down. An example retry flow is described with reference to FIG. 2.

Figure 2:
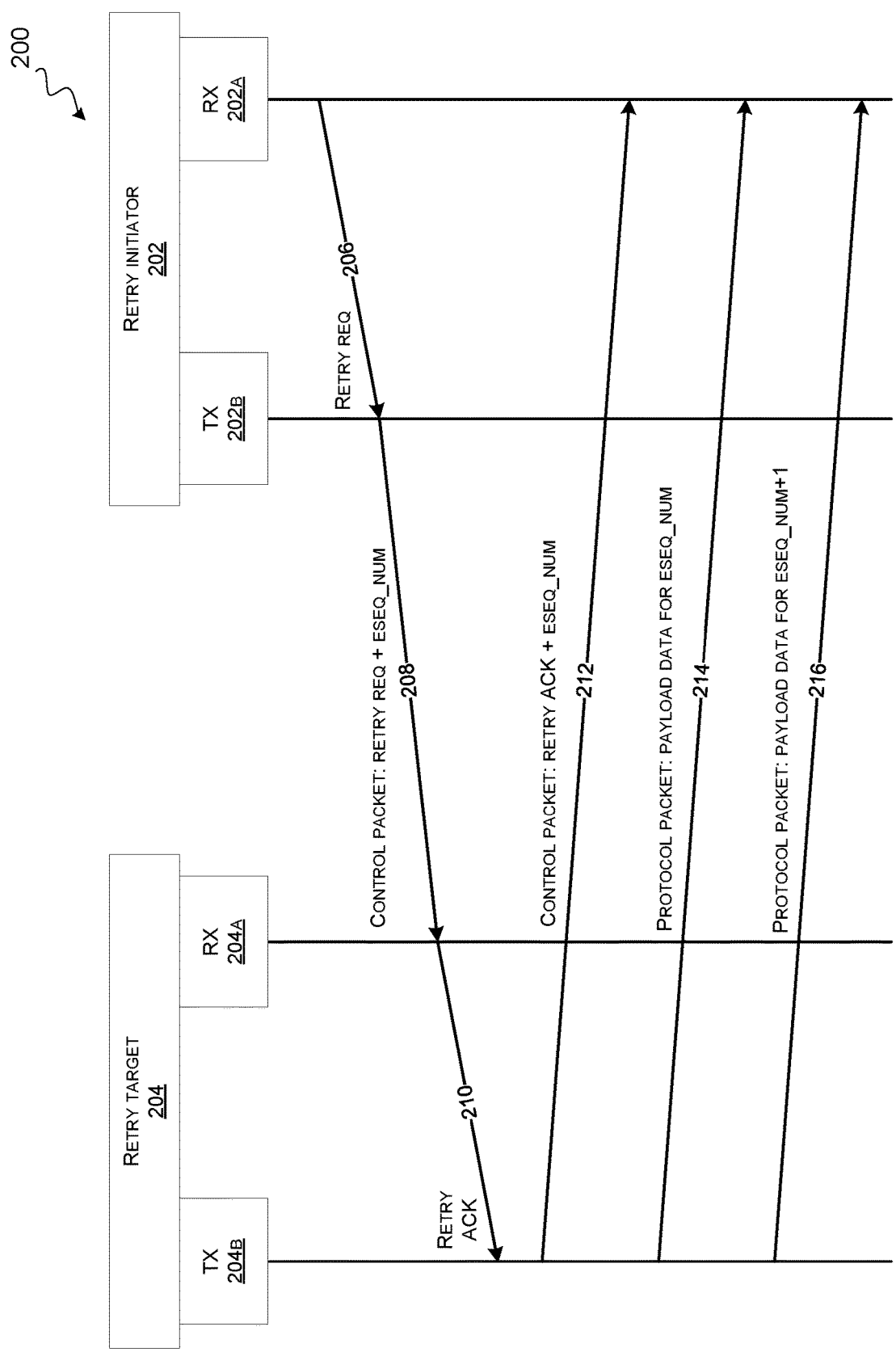
FIG. 2 illustrates an example retry flow that can be performed to maintain link resiliency using a link layer reliability (LLR) circuit, according to some embodiments.

FIG. 2 illustrates an example retry flow 200 that can be performed to maintain link resiliency using LLR, according to some embodiments. For example, the retry flow can be performed to maintain link resiliency when the bus link 118 between the first communication device 102 and the second communication device 104 fails.

In some examples, a retry initiator 202 can be the second LLR 114 and a retry target 204 can be the first LLR 108. The retry initiator 202 can include an RX 202a and a TX 202b, and the retry target 204 can include an RX 204a and a TX 204b. In the normal operation, the retry target 204 may store transactions in a retry buffer that were transmitted to the retry initiator 202, until an ack is received from the retry initiator 202 after receiving those transactions. The retry flow 200 may be initiated by the retry initiator 202 to request the retry target 204 to resend the transactions that did not complete due to the link down event. The RX 202a may send a retry request 206 to the TX 202b to initiate the retry flow. The TX 202b may send a control packet 208 to the retry target 204 over the bus link 118. The control packet 208 may include the retry request and the expected sequence number. The expected sequence number corresponds to the transaction with the payload data that the retry initiator 202 was expecting before the link down event, and is based on the sequence number counter in the RX 202a. For example, the retry initiator 202 may be expecting 8 transactions from the retry target 204 based on the available credits; however, only 4 transactions were received due to the link failure.

The RX 204a may receive the control packet 208 from the retry initiator 202 and send a retry ack 210 to the TX 204b comprising the expected sequence number (eseq_num). The TX 204b may acknowledge the retry request by sending a control packet 212 with a retry ack and the expected sequence number to the retry initiator 202 over the bus link 118. The TX 204b may use the expected sequence number to read a corresponding entry from the local retry buffer, and provide a protocol packet 214 with the payload data retrieved from the retry buffer for the expected sequence number. Similarly, another protocol packet 216 with the payload data corresponding to the next entry (e.g., eseq_num+1) in the retry buffer can be read to be sent to the retry initiator 202. Once all the protocol packets for the expected transactions have been received, the retry flow ends, and the normal operation can be resumed.

Figure 3:
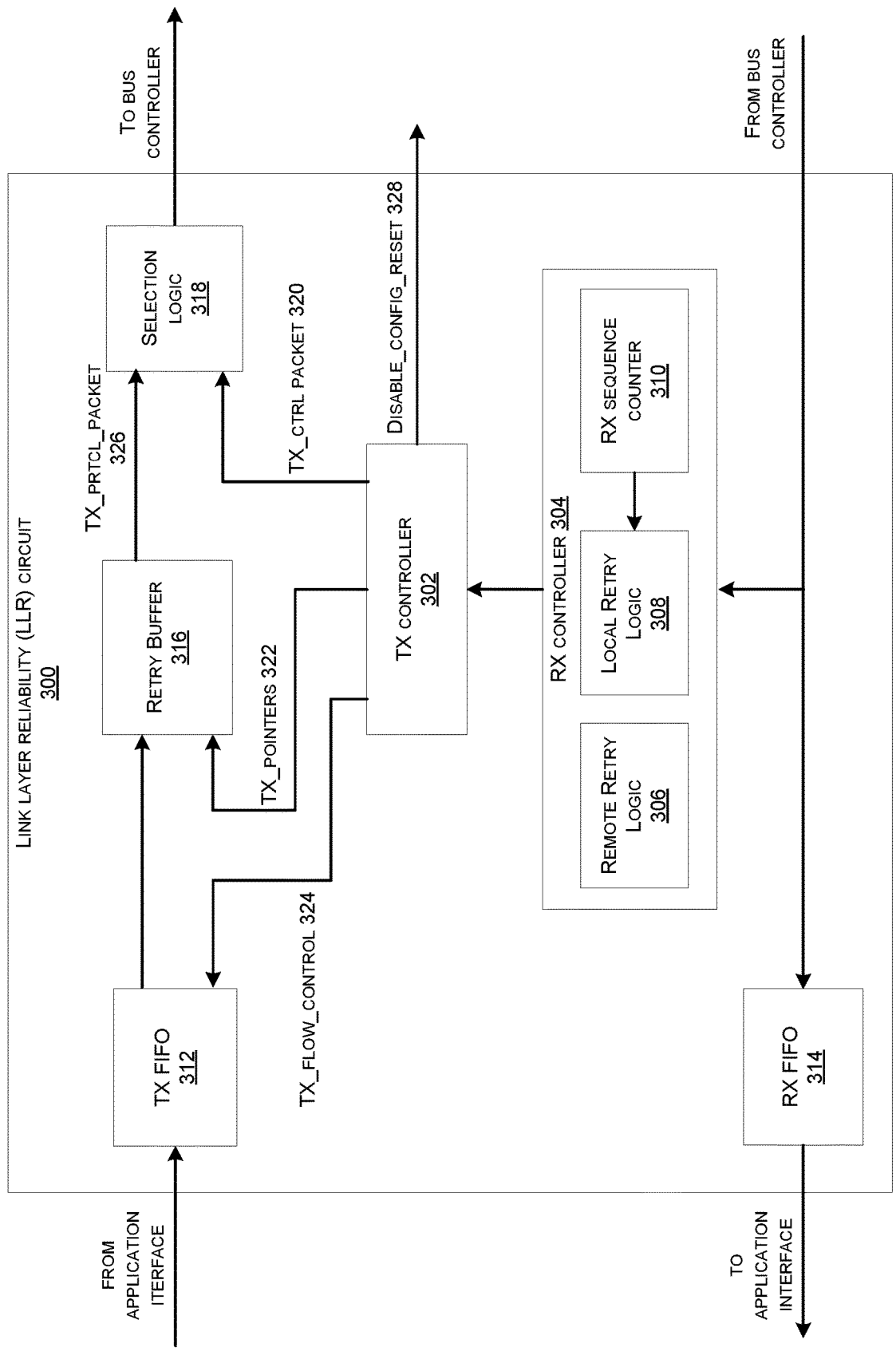
FIG. 3 illustrates an example block diagram of the LLR circuit that can be used to provide link down resiliency, according to some embodiments.

FIG. 3 illustrates an example block diagram of an LLR circuit 300 that can be used to provide link down resiliency, according to some embodiments. As an example, the LLR circuit 300 can be used to implement the first LLR 108 and the second LLR 114 described in FIG. 1. In some implementations, the LLR circuit 300 may include a TX controller 302, an RX controller 304, a TX FIFO 312, an RX FIFIO 314, a retry buffer 316, and selection logic 318. Different components of the LLR circuit 300 can be implemented using registers, state machines, buffers, counters, multiplexers, de-multiplexers, FIFOs, etc.

The LLR circuit 300 may receive traffic from the corresponding application interface for transmitting to the peer device over the bus link 118, and receive the traffic from the peer device over the bus link 118 for providing to the corresponding application interface. The TX FIFO 312 may be configured to receive packets from the corresponding application interface for transmitting to the peer device over the bus link 118. The RX FIFO 314 may be configured to store packets received from the peer device over the bus link 118 for providing to the corresponding application interface. The TX FIFO 312 and the RX FIFO 314 may communicate with the application interface using appropriate data buses and control signals based on the implementation.

The TX controller 302 may be configured to manage the TX path by providing controls to the TX FIFO 312, retry buffer 316, and the selection logic 318. In some embodiments, the TX controller 302 may insert a LLR header in each packet (e.g., transaction layer packet (TLP)) that is transmitted over the bus link 118 to support the retry flow. The LLR header may include a header type bit to indicate whether the packet is a protocol packet carrying the payload data, or a control packet carrying information associated with the retry flow or the normal flow. For example, a TX_prtcl_packet 326 may include a protocol packet with the payload data for a transaction received from the TX FIFO 312, and a TX_ctrl_packet 320 may include a control packet that includes control bits or debug information. In some embodiments, the control bits may include retry flow information to provide link down resilience due to a link down event. The TX controller 302 may also provide a TX_flow_control signal 324 to the TX FIFO 312 to halt (or pause) or un-halt (or resume) the traffic being received by the TX FIFO 312 from the application interface to avoid overflow, or loss of packets due to a link down event.

During the normal operation, the retry buffer 316 may receive packets with the payload data from the TX FIFO 312 for transmitting to the peer device. The retry buffer 316 may be configured to store every protocol packet with the payload data that is transmitted over the bus link 118 for which an acknowledgment has not yet been received. The depth of the retry buffer 316 may represent the maximum number of credits per link, and can be configured to be more (e.g., 5-10% more) than the round-trip delay to avoid introducing latency. An ack is returned from the peer device at a configurable ack2credit ratio. For example, for each N transactions (e.g., N can be 4, 6, or 8) read out from the RX FIFO 314 on the peer device, an ack can be returned and the available credits for the retry buffer 316 are incremented by N.

In some embodiments, the TX controller 302 may include a free_buf_entries counter (not shown), which may correspond to number of available entries in the retry buffer 316, and represent the number of available transmission credits. The free_buf_entries counter can be decremented each time the retry buffer 316 is written, and incremented every time an ack is received from the peer device based on the programmable ratio of ack2credit. In some examples, credit return received by the TX controller 302 can free up corresponding entries in the retry buffer 316.

The TX controller 302 may be configured to generate a disable_config_reset signal 328 upon detecting that the link down event has occurred. The disable_config_reset signal 328 can be used to prevent reset of the non-sticky registers in the PCIe configuration space (not shown), so that their configurations can be maintained during the link down event without involving the higher-level software.

The TX controller 302 may also provide TX_pointers 322 to the retry buffer 316 comprising a TX write pointer and a TX read pointer. For example, the TX write pointer may indicate an entry index for storing the next protocol packet, and the TX read pointer may indicate an entry index used to read the contents of the retry buffer 316. The TX controller 302 can increment a TX-side sequence number counter to increment the TX write pointer each time a TX_prtcl_packet 326 is transmitted to the peer device. The TX_prtcl_packet 326 may include payload data retrieved from the retry buffer 316 using the TX read pointer. Once an ack is received from the peer device, the corresponding packets can be removed from the retry buffer 316. The read pointer can be incremented each time a packet is sent from the retry buffer 316. During the retry flow, the read pointer can be set to the expected sequence number provided by the peer device to read the payload data from the retry buffer 316 that was not received by the peer device due to the link down event.

The RX controller 304 may include remote retry logic 306, local retry logic 308, and a RX sequence number counter 310. The RX sequence number counter 310 can include a cyclic counter that tracks the TX write pointer for the retry buffer 316 on the peer device. The RX sequence number counter 310 may represent the expected sequence number of the next protocol packet that the local device is expecting to receive. The local retry logic 308 may be configured to generate a retry request when the local device is operating as the retry initiator. For example, the local retry logic 308 may generate the retry request after the link recovery based on the available credits. The local retry logic 308 may include the expected sequence number in the retry request based on the RX sequence number counter 310. For example, the retry request can be part of the control packet 208 in FIG. 2.

The remote retry logic 306 may be configured to receive a remote retry request from the peer device that is operating as a retry initiator, and the remote retry logic 306 is on the local device operating as a retry target. The remote retry logic 306 may use the expected sequence number in the remote retry request to trigger the local TX controller 302 to resend the corresponding packets. For example, the remote retry logic 306 may send the retry ack 210 to the TX controller 302, which can use the expected sequence number to read the retry buffer 316. The local retry logic 308 and the remote retry logic 306 may include state machines and other suitable logic based on the implementation.

Figure 4A:
FIG. 4A illustrates an example packet format for a protocol packet, according to some embodiments.

FIG. 4A illustrates an example packet format for a protocol packet 400A, according to some embodiments. The protocol packet 400A can be an example of the TX_prtcl_packet 326 in FIG. 3, and the protocol packets 214 and 216 in FIG. 2.

As an example, the protocol packet 400A can be 65 bytes wide, which includes a [0] byte for an LLR header 402a, and [65:1] bytes for a payload 404a. The LLR header 402a can be an example LLR header that is added by the LLR circuit 300 to the payload data received from an application via the application interface for transmitting to the peer device over the bus link 118. In some implementations, the LLR header 402a may include a header type bit [0], an ack bit [1], an idle bit [2], and reserved bits [7:3]. The header type bit [0] can be set to "0" for a protocol packet. The ack bit [1] can be set to "1" to send an acknowledgement to the peer device. In some implementation, a control packet is sent with an ack bit set after receiving a certain number of packets based on the ack2credit ratio. The idle bit [2] can be set to "0" to indicate a payload packet when the header type bit [0] indicates a protocol packet, and the payload 404a includes 64 bytes of payload data.

In some embodiments, the LLR circuit 300 may generate a protocol packet that does not include payload data received from the application interface. For example, in some cases, the LLR circuit 300 may return flow credits when the communication is not symmetrical (one side application is transmitting lot of packets but other side is not). In this case an ack can be sent in the protocol packet. For example, the idle bit [2] can be set to "1" to indicate a credit-return packet with no data. In this case, the payload 404a may include debug information [3:1] for the credit return, which may include current values of the TX write pointer, the free_buf_entries counter, and/or any other information.

Figure 4B:
FIG. 4B illustrates an example packet format for a control packet, according to some embodiments.

FIG. 4B illustrates an example packet format for a control packet 400B, according to some embodiments. The control packet 400B can be an example of the TX_ctrl_packet 320 in FIG. 3, and the control packets 208 and 212 in FIG. 2.

As an example, the control packet 400B can be 65 bytes wide, which includes a [0] byte for an LLR header 402b, and [65:1] bytes for a payload 404b. The LLR header 402b can be an example LLR header that is added by the TX controller 302 upon receiving the retry req 206 from the local retry logic 308. In some implementations, the LLR header 402b may include a header type bit [0], opcode bits [3:1], and reserved bits [7:4]. The header type bit [0] can be set to "1" for a control packet. The opcode bits [3:1] may represent different states of the retry flow. For example, a value of 0 indicates "idle" state, a value of 4 indicates a "retry idle" state, a value of 5 indicates a "retry req" state, a value of 6 indicates a "retry ack" state, and a value of 7 indicates a "retry ack empty" state. The "idle" state may indicate the normal flow. The retry ack empty" state may indicate that the retry buffer 316 is empty, and there are no retried packets to send.

The payload 404b may include an expected sequence number in byte [1] for all retry opcodes, and reserved bytes [65:2]. All retry opcodes include the values of 4, 5, 6, and 7 in the opcode bits [3:1] of the LLR header 402b. The expected sequence number in byte [1] can be the value of RX sequence number counter 310, which can be provided by the retry initiator in the TX_ctrl_packet 320 for different retry opcodes. The reserved bytes [65:2] can be used to include other information associated with the retry flow or the link down event based on the implementation.

Figure 5:
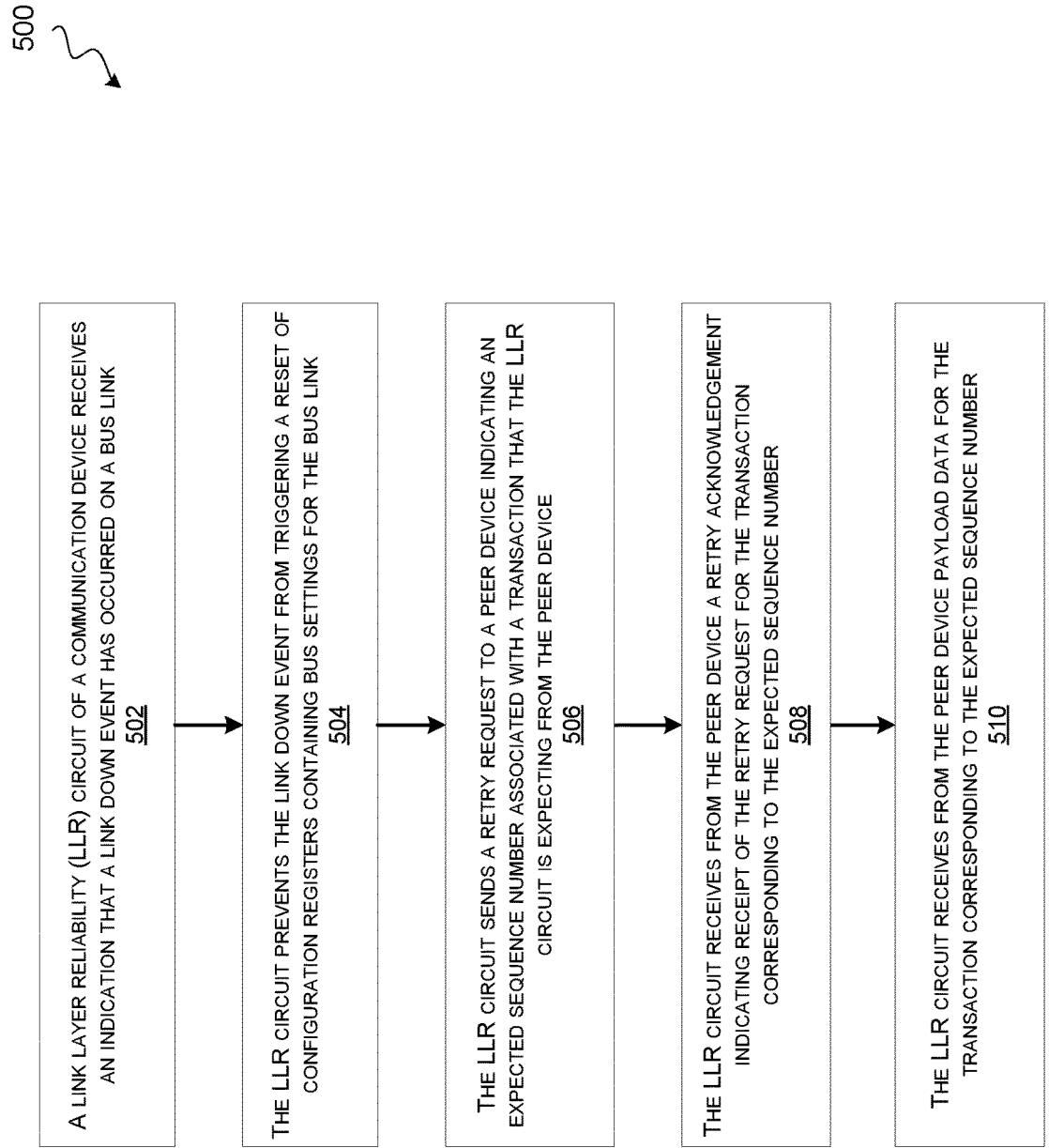
FIG. 5 illustrates an example flowchart for a method to provide link down resilience using LLR circuits, according to some embodiments.

FIG. 5 illustrates an example flowchart 500 for a method to provide link down resilience using LLR circuits, according to some embodiments. For example, the LLR circuit 300 can be used to provide link down resilience for the bus link 118 between the first communication device 102 and the second communication device 104. The bus link 118 can be a PCIe link that is established on a PCIe port, and the LLR circuit 300 is configured to provide resilience to the PCIe link. The link down resilience can also be applied to other bus protocols such as CXL.

In step 502, the method includes receiving, by the LLR circuit of a communication device, an indication that a link down event has occurred on a bus link. As an example, the LLR circuit can implement the LLR 114 on the second communication device 104. The LLR 114 may receive an indication from the second bus controller 112 that a link down event has occurred on the bus link 118. In response to the link down event, the LLR 114 may wait until posted transactions for the bus link 118 have been flushed from the second bus controller 112, and halt the traffic being sent to the bus link 118 from the second application interface 116. After the posted transactions have been flushed, the LLR 114 may instruct the second bus controller 112 to restore the bus link 118.

In step 504, the method includes preventing, by the LLR circuit, the link down event from triggering a reset of configuration registers containing bus settings for the bus link. For example, the TX controller 302 on the LLR 114 may generate the disable_config_reset signal 328 upon detecting that the link down event has occurred. The disable_config_reset signal 328 can be used to prevent reset of the non-sticky registers in the PCIe configuration space, so that the software configurations can be maintained during the link down event.

In step 506, the method includes sending, by the LLR circuit to a peer device, a retry request indicating an expected sequence number associated with a transaction that the LLR circuit is expecting from the peer device. The LLR 114 may wait until the bus link 118 has been restored before sending the retry request. The LLR 114 can be the retry initiator 202 and the LLR 108 can be the retry target 204. For example, the local retry logic 308 on the LLR 114 may send the retry request 206 with the value of the RX sequence number counter 310 to the TX controller 302. The TX controller 302 may generate the control packet 208 that includes the opcode bits [3:1] in the LLR header 402b set to 5 indicating a retry request, and the expected sequence number byte [1] in the payload 404b using the RX sequence number counter 310. The control packet 208 may be sent via the selection logic 318 to the first communication device 102 over the bus link 118.

In step 508, the method includes receiving, by the LLR circuit from the peer device, a retry acknowledgment indicating receipt of the retry request for the transaction corresponding to the expected sequence number. The remote retry logic 306 on the LLR 114 may receive the control packet 212 from the first communication device 102 with the retry ack and the expected sequence number. For example, the control packet 212 may be generated by the TX controller 302 on the LLR 108 that includes the opcode bits [3:1] in the LLR header 402b set to 6 indicating a retry ack, and the expected sequence number byte [1] in the payload 404b as the expected sequence number received in the control packet 208. The control packet 212 may be sent via the selection logic 318 to the second communication device 104 over the bus link 118.

In step 510, the method includes receiving, by the LLR circuit from the peer device, payload data for the transaction corresponding to the expected sequence number. The remote retry logic 306 on the LLR 114 may receive the protocol packet 214 from the first communication device 102 with the payload data in the payload 404a. For example, TX controller 302 on the LLR 108 can use the expected sequence number counter value as the TX read pointer to read the corresponding payload stored in the retry buffer 316. The protocol packet 214 may be sent via the selection logic 318 to the second communication device 104 over the bus link 118. The TX controller 302 on the LLR 114 can resume traffic being sent to the bus link 118 from the second application interface 112 in response to receiving the payload data for the transaction corresponding to the expected sequence number.

In some examples, the LLR 108 can be the retry initiator 202 and the LLR 114 can be the retry target 204. For example, the LLR 114 can receive a remote retry request from the LLR 108 containing a remote expected sequence number corresponding to a transaction expected by the LLR 108. The remote retry logic 306 on the LLR 114 may receive the retry request 206 with the remote expected sequence number that was provided by the RX sequence number counter 310 on the LLR 108. The TX controller 302 on the LLR 114 can send, from the retry buffer 316, a transaction associated with the remote expected sequence number.

Thus, the techniques described herein can use the LLR circuit to provide link down resilience for the bus link that is based on a bus protocol that does not support link reliability for the link down event. The LLR circuit can provide link down resilience by preventing the reset of the configuration registers of the bus link upon detecting a link down event to maintain bus configurations, and by executing a retry sequence after the link has been restored to retry performing the transactions that did not complete due to the link down event. Thus, link reliability can be maintained without the loss of data, which can reduce interruptions to customer facing applications, and improve system performance.

Figure 6:
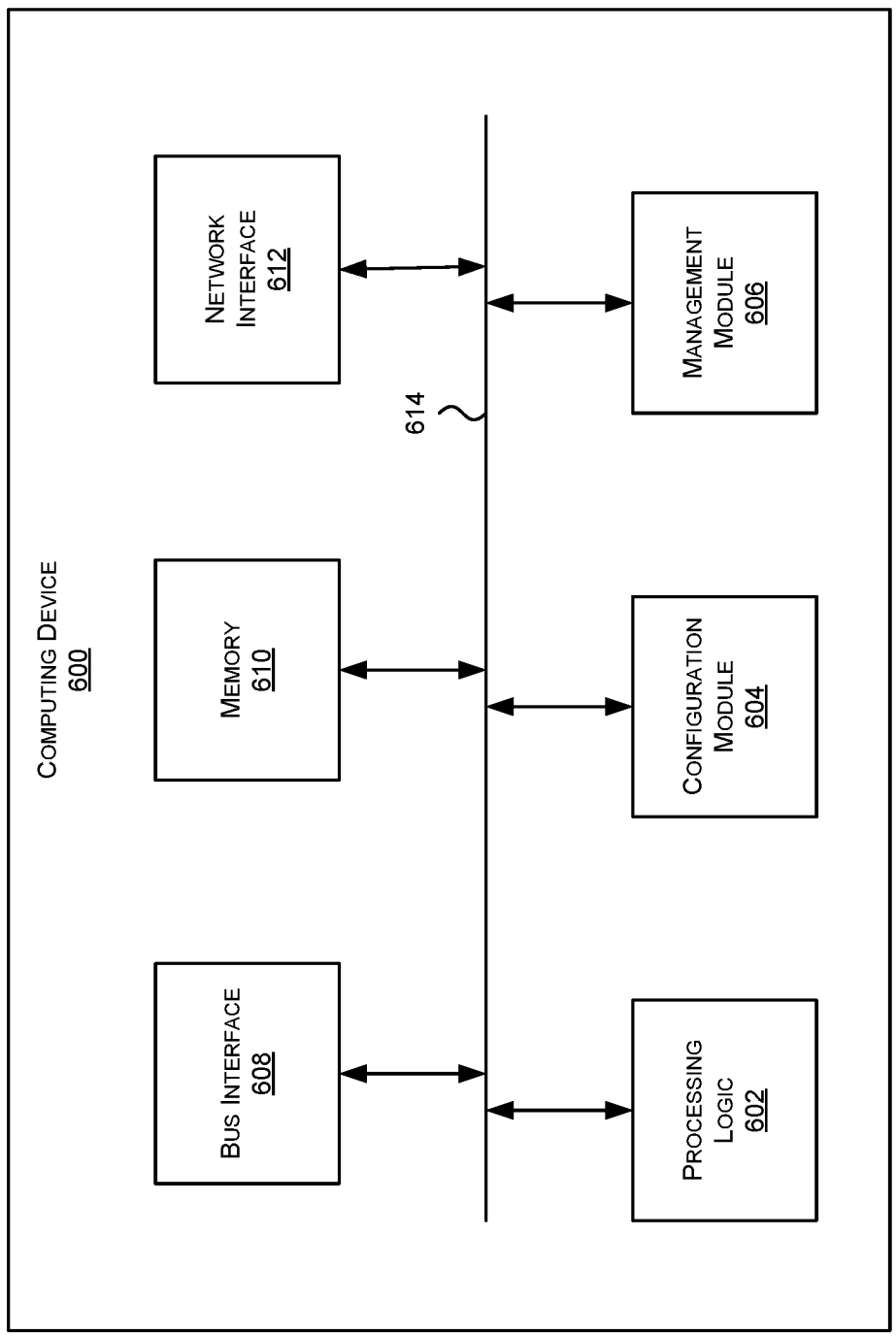
FIG. 6 illustrates an example of a computing device, according to certain aspects of the disclosure.

FIG. 6 illustrates an example of a computing device 600. Functionality and/or several components of the computing device 600 may be used without limitation with other embodiments disclosed elsewhere in this disclosure, without limitations. A computing device 600 may facilitate processing of packets and/or forwarding of packets from the computing device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 600 may be the recipient and/or generator of packets. In some implementations, the computing device 600 may modify the contents of the packet before forwarding the packet to another device. The computing device 600 may be a peripheral device coupled to another computer device, a switch, a router or any other suitable device enabled for receiving and forwarding packets. The computing device 600 can be an example of the first communication device 102 and the second communication device 104.

In one example, the computing device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules, which are not illustrated here. In some implementations, the computing device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM©, MIPS©, AMD©, Intel©, Qualcomm©, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the computing device 600, while in other cases some or all of the memory may be external to the computing device 600. The memory 610 may store an operating system comprising executable instructions that, when executed by the processing logic 602, provides the execution environment for executing instructions providing networking functionality for the computing device 600. The memory may also store and maintain several data structures and routing tables for facilitating the functionality of the computing device 600.

In some implementations, the configuration module 604 may include one or more configuration registers. Configuration registers may control the operations of the computing device 600. In some implementations, one or more bits in the configuration register can represent certain capabilities of the computing device 600. Configuration registers may be programmed by instructions executing in the processing logic 602, and/or by an external entity, such as a host device, an operating system executing on a host device, and/or a remote device. The configuration module 604 may further include hardware and/or software that control the operations of the computing device 600.

In some implementations, the management module 606 may be configured to manage different components of the computing device 600. In some cases, the management module 606 may configure one or more bits in one or more configuration registers at power up, to enable or disable certain capabilities of the computing device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc.

The various components and modules of the computing device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
   a communication device including a bus controller configured to manage a Peripheral Component Interconnect Express (PCIe) port, and a link layer reliability (LLR) circuit configured to provide resilience to a PCIe link established on the PCIe port; and
   a peer device coupled to the PCIe link,
   wherein the LLR circuit is further configured to:
      track transactions received from the peer device via the PCIe link using a sequence number counter;
      receive a link down indication from the bus controller that a link down event has occurred on the PCIe link;
      prevent the link down event from triggering a reset to configuration space registers for the PCIe link;

instruct the bus controller to restore the PCIe link on the PCIe port;
receive an indication from the PCIe port that the PCIe link has been restored; and
send a first control packet on the PCIe link to the peer device, the first control packet including a retry request and an expected sequence number associated with a transaction that the peer device was expecting when the PCIe link went down, the expected sequence number being based on the sequence number counter; and wherein the peer device is further configured to:
upon receiving the retry request, send a second control packet on the PCIe link to the communication device, the second control packet including a retry acknowledgement and the expected sequence number to the communication device; and
send a protocol packet on the PCIe link to the communication device, the protocol packet including payload data for the transaction associated with the expected sequence number.

2. The system of claim 1, wherein the LLR circuit is configured to:
in response to the link down event, halt traffic being sent to the PCIe port from an interconnect fabric of the communication device.

3. The system of claim 1, wherein the LLR circuit is configured to wait until the bus controller has flushed posted transactions before instructing the bus controller to restore the PCIe link.

4. A method, comprising:
receiving, by a link layer reliability (LLR) circuit of a communication device, an indication that a link down event has occurred on a bus link;
preventing, by the LLR circuit, the link down event from triggering a reset of configuration registers containing bus settings for the bus link;
sending, by the LLR circuit to a peer device, a retry request indicating an expected sequence number associated with a transaction that the LLR circuit is expecting from the peer device;
receiving, by the LLR circuit from the peer device, a retry acknowledgment indicating receipt of the retry request for the transaction corresponding to the expected sequence number; and
receiving, by the LLR circuit from the peer device, payload data for the transaction corresponding to the expected sequence number.

5. The method of claim 4, further comprising:
tracking transactions received on the bus link using a receive-side sequence number counter in the LLR circuit, wherein the expected sequence number is determined based on the receive-side sequence number counter.

6. The method of claim 4, further comprising:
in response to the link down event:
waiting until posted transactions for the bus link have been flushed from a bus controller of the communication device;
instructing the bus controller to restore the bus link after the posted transactions have been flushed; and
waiting until the bus link has been restored before sending the retry request.

7. The method of claim 4, further comprising:
in response to the link down event, halting traffic being sent to the bus link from an application interface of the communication device.

8. The method of claim 7, further comprising:
in response to receiving the payload data for the transaction corresponding to the expected sequence number, resuming traffic being sent to the bus link from the application interface of the communication device.

9. The method of claim 7, wherein the application interface is an interconnect fabric of the communication device.

10. The method of claim 4, further comprising:
tracking transactions being sent by the LLR circuit on the bus link to the peer device using a transmit-side sequence number counter; and
storing, in a retry buffer of the LLR circuit, transactions sent on the bus link that are pending an acknowledgement from the peer device.

11. The method of claim 10, wherein each acknowledgement received from the peer device is configured to acknowledge multiple transactions sent by the LLR circuit according to a programmable ratio.

12. The method of claim 10, further comprising:
receiving a remote retry request from the peer device, the remote retry request containing a remote expected sequence number corresponding to a transaction expected by the peer device; and
sending, from the retry buffer, a transaction associated with the remote expected sequence number.

13. The method of claim 4, wherein the bus link is a Peripheral Component Interconnect express (PCIe) link or a Compute Express Link (CXL) link.

14. The method of claim 4, wherein the bus link is based on a bus protocol that does not support link reliability for the link down event.

15. An integrated circuit (IC) in a communication device, configured to:
receive an indication that a link down event has occurred on a bus link between the communication device and a peer device;
prevent the link down event from triggering a reset of configuration registers containing bus settings for the bus link;
send, to the peer device, a retry request indicating an expected sequence number associated with a transaction that is expected from the peer device;
receive, from the peer device, a retry acknowledgment indicating receipt of the retry request for the transaction corresponding to the expected sequence number;
receive, from the peer device, payload data for the transaction corresponding to the expected sequence number; and
track transactions received on the bus link using a receive-side sequence number counter in the IC, wherein the expected sequence number is determined based on the receive-side sequence number counter.

16. The IC of claim 15, further configured to:
track transactions being sent on the bus link to the peer device using a transmit-side sequence number counter; and
store, in a retry buffer, transactions sent on the bus link that are pending an acknowledgement from the peer device.

17. The IC of claim 16, further configured to:
receive a remote retry request from the peer device, the remote retry request containing a remote expected sequence number corresponding to a transaction expected by the peer device; and
send, from the retry buffer, a transaction associated with the remote expected sequence number.

18. The IC of claim 15, further configured to:
in response to the link down event:
- wait until posted transactions for the bus link has been flushed from a bus controller of the communication device;
- instruct the bus controller to restore the bus link after the posted transactions have been flushed; and
- wait until the bus link has been restored before sending the retry request.

19. The IC of claim 15, further configured to:
in response to the link down event, halt traffic being sent to the bus link from an application interface of the communication device; and
in response to receiving the payload data for the transaction corresponding to the expected sequence number, resume traffic being sent to the bus link from the application interface of the communication device.

* * * * *